UNITED STATES PATENT OFFICE.

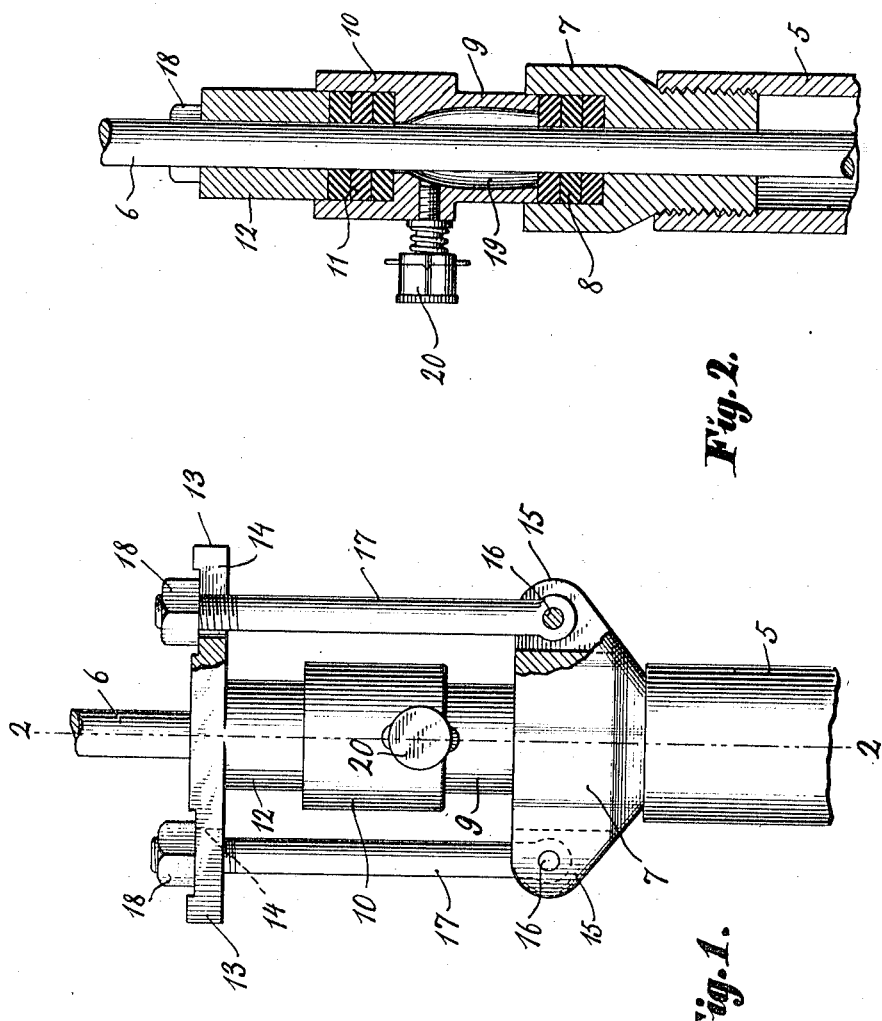

ROBERT S. GARRY, OF SUMNER, ILLINOIS.

STUFFING-BOX.

1,051,879. Specification of Letters Patent. Patented Feb. 4, 1913.

Application filed November 1, 1911. Serial No. 657,918.

*To all whom it may concern:*

Be it known that I, ROBERT S. GARRY, a citizen of the United States, residing at Sumner, in the county of Lawrence and State of Illinois, have invented certain new and useful Improvements in Stuffing-Boxes, of which the following is a specification.

The stuffing box which is the subject of the present invention is designed more particularly for use in connection with the pump rods of oil well or water pumps, and it is the object of the invention to provide a simple and highly efficient stuffing box, having means for lubricating the pump rod.

In the accompanying drawing forming a part of this specification, Figure 1 is an elevation of the stuffing box, and Fig. 2 is a vertical section on the line 2—2 of Fig. 1.

Referring specifically to the drawing, 5 denotes the well tube, and 6 the rod of the pump, said rod being commonly known as the polish rod. Into the upper end of the well tube is screwed a stuffing box 7 through which the rod 6 passes. The stuffing box contains a series of packing rings 8 which are compressed around the rod by a gland 9, the latter being reduced at its lower end so that it may enter the stuffing box and be forced down against the packing rings. The upper end of the gland is enlarged and formed with a stuffing box 10 through which the rod 6 also passes. This stuffing box also contains packing rings 11 which are compressed around the rod by a gland 12, which has outstanding side flanges 13, the extremities of which are slotted as indicated at 14. On the stuffing box 7 are slotted ears 15 to which are pivoted, as indicated at 16, clamping bolts 17 for holding the gland 12 in place. These bolts pass through the slots 14 and are provided with nuts 18 screwing down against the flanges 13, whereby the gland is held tightly down on the packing rings 11 and the latter are compressed around the rod. This method of fastening the gland 12 enables it to be quickly applied or removed, it being necessary only to loosen the nuts 18, after which the bolts 17 can be swung sidewise to clear the slots 14, which releases the gland.

The lower end of the gland 9 has an enlarged bore 19 whereby a lubricant pocket is formed through which the rod 6 passes. It will be noted that this pocket is located between the packing rings 8 and 11. The pocket is supplied with lubricant through a grease cup 20; or the gland 9 may be removed and the pocket filled from the lower end thereof. By providing a lubricant pocket between the two sets of packing rings, the rod is protected from the water, and rusting and corrosion is prevented.

I claim:

The combination of a stuffing box having slotted ears, a gland closing the box, said gland having a lubricant pocket which opens into the stuffing box, and the outer end of the gland being enlarged to form a second stuffing box, a gland for the said second stuffing box, said second-mentioned gland having outstanding flanges, the extremities of which are slotted, clamping bolts pivoted to the ears of the first-mentioned stuffing box and passing through the slots of the aforesaid flanges, and nuts screwed on the clamping bolts against the flanges.

In testimony whereof I affix my signature in presence of two witnesses.

ROBERT S. GARRY.

Witnesses:
 WILLIAM I. GEERY,
 JEROME GARRY.